(No Model.)
J. S. HICKMAN.
SEED DROPPER.
No. 435,829. Patented Sept. 2, 1890.
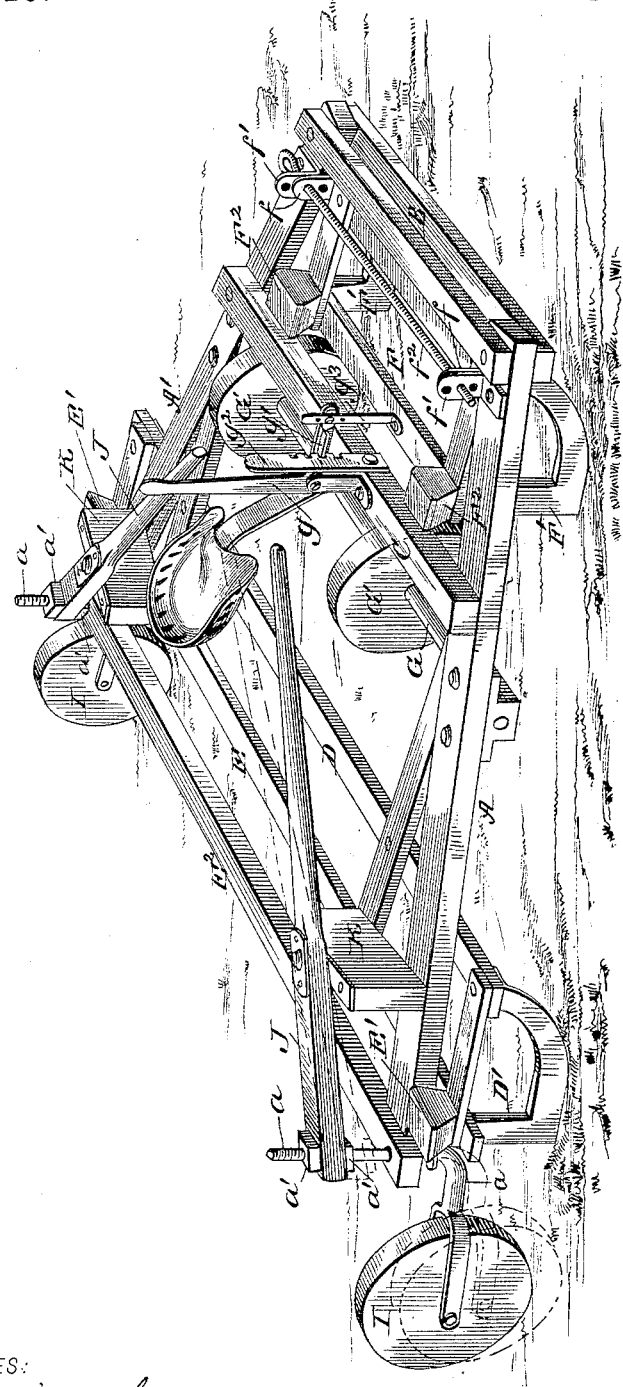
WITNESSES:
Fred G. Dieterich
Edw. W. Byrn.
INVENTOR:
James S. Hickman.
BY Munn & Co.
ATTORNEYS

UNITED STATES PATENT OFFICE.

JAMES S. HICKMAN, OF HICKMAN, ILLINOIS.

SEED-DROPPER.

SPECIFICATION forming part of Letters Patent No. 435,829, dated September 2, 1890.

Application filed January 16, 1890. Serial No. 337,053. (No model.)

*To all whom it may concern:*

Be it known that I, JAMES S. HICKMAN, of Hickman, in the county of Iroquois and State of Illinois, have invented a new and useful Improvement in Seed-Droppers, of which the following is a specification.

My invention relates to that class of seed-droppers in which the machine is drawn across the field by the team, and the dropping devices of the planter may be operated by a rope or wire stretched across the field and provided with knots or projections on it, which, operating upon the feed devices, cause the seed to be dropped at intervals measured by every such knot or projection on the rope or wire.

My invention consists in the peculiar construction of the planter whereby it is adapted to plant two, three, or four rows or more at one crossing of the field, thus saving much time in the readjustment of the rope or wire and enabling the driver to accomplish a much larger amount of work in the same time and with the same team.

The figure is a perspective view.

A A' is a divergent frame narrow at its front end and spreading out to a greater width at the rear. This frame is provided with cross-bars B C D E E². In the front part of the main frame is a rectangular runner-frame F, which has two furrow-openers F' F' on its under side set about four feet (more or less) apart, and each of which runners has above its rear end a seed-box F². The front part of this runner-frame is provided with upturned ears $f$, which lie alongside of ears $f'$ on the main frame, and to which they are hung by a rod $f^2$, passing through both sets of ears and forming an axis about which the runner-frame is adjusted. The rear end of this runner-frame rises and falls about this axis, but may be held rigidly, either up or down, by locking devices consisting of a lever $g$, fulcrumed on cross-bar C, and having a lip $g'$, that engages any one of the notches of bar $g^2$ on said cross-bar, the short end of the lever $g$ being connected to the runner-frame by a bar $g^3$. The cross-bar C also carries the driver's seat, and just back of this cross-bar is disposed an axle G, with the front supporting-wheels G' G'.

To the outer ends of the rear cross-bars D E are attached other runners or furrow-openers D' and seed-boxes E', which are separated a distance of twelve feet (more or less) from each other, or three times the distance between the front runners, each rear runner being four feet (more or less) outside of the path of the adjacent front runner, so that there shall be a distance of about four feet between each of the four rows of corn or other seed to be planted.

At each rear corner of the main frame there is arranged a trailing caster-wheel I, having the shank $a$ of its forked frame bent at right angles and extended through a vertical hole in the corner of the main frame. This shank plays loosely through said hole, and at its upper end it is screw-threaded and passes through the rear end of a lever J, of which there is one on each side, the shank $a$ being loosely held to the lever by nuts $a'$ $a'$ on the shank, one above and the other below the end of the lever. These levers are fulcrumed upon blocks K and extend close up to the driver's seat upon opposite sides of the same.

In describing the operation of my device I would state that the two front seed-boxes F² F² are intended to be provided with a transverse slide or rotary dropping device, which is acted upon by the projections on the rope or wire stretched across the field, and the two rear seed-boxes E' E' are designed to be similarly equipped and to be similarly acted upon by the projections on the wire.

As the wire and the seed-slide are well known and not claimed by me, I do not regard it necessary to show them, but have merely indicated the position of the seed-boxes and runners, which is a vital part of my invention.

The object in placing the two extra runners and seeding devices in the rear of the middle front ones is not only to be able to plant four rows at once, but the arrangement shown permits such wide machine to be easily turned, for when the end of the row is reached the rear and widely-separated runners are thrown out of the ground by forcing the caster-wheels down through the levers J J, which causes the rear ends of the frame to be supported upon the caster-wheels, which travel in any direction in turning curves. When turning curves, the front runners are also raised out of contact with the ground by means of the lever $g$ and the locking devices, and the entire planter is then sustained upon the front supporting-wheels G' and the rear trailing caster-wheels. In planting, the front runner-frame is let down to contact with the ground and is locked in this position, and the rear runners are also down against the ground and support the full weight of the planter. As the machine is drawn across the field, the same wire or rope (with its knots or projections) acts upon both seed-slides, the knots throwing the seed slides or disks of the front set of boxes first and then passing to the seed slides or disks of the second set of boxes and throwing them. This causes the seed to be dropped in four rows in perfect check-row. The knots of the rope or wire may, however, act only on one set of seed-droppers, and this set may be connected to the other set by a lever or chain.

Instead of having the narrow end of the machine at the front and the wide end at the rear, the position of the frame may be reversed, so as to make the wide end in front and the narrow end at the rear, a few slight changes only being required in such case.

Instead of using runners, disks, flukes, shovels, or blades may be employed.

Having thus described my invention, what I claim as new is—

1. In a seed-dropper, the combination, with a main frame made wider at one end than at the other, of a pair of runners and seeding devices arranged at one end of the frame and a pair of runners and seeding devices arranged at the other end and separated a distance three times that between the runners of the front end, and a pair of vertically-adjustable caster-wheels with levers for raising one end of the frame from the ground, substantially as shown and described.

2. In a seed-dropper, the combination, with a main frame made wider at the rear, of an independently-adjustable frame in front having runners and seeding devices and a second set of runners and seeding devices fixed to the main frame in the rear and spaced three times the distance of the front runners, a set of vertically-adjustable caster-wheels for supporting the main frame, and levers for operating them, substantially as shown and described.

JAMES S. HICKMAN.

Witnesses:
 ALEX. PETE,
 J. A. WEBSTER.